US012659089B2

(12) United States Patent
Turner et al.

(10) Patent No.: US 12,659,089 B2
(45) Date of Patent: Jun. 16, 2026

(54) METHOD AND SYSTEM FOR EXCHANGING SECONDARY CELL INFORMATION FOR CARRIER AGGREGATION

(71) Applicant: John Mezzalingua Associates, LLC, Liverpool, NY (US)

(72) Inventors: Stephen Turner, Mecahnicsville, VA (US); Randal Eye, Richmond, VA (US); Giovanni Ferri, Pesaro (IT)

(73) Assignee: John Mezzalingua Associates, LLC, Liverpool, NY (US)

( * ) Notice: Subject to any disclaimer, the term of this patent is extended or adjusted under 35 U.S.C. 154(b) by 415 days.

(21) Appl. No.: 18/138,965

(22) Filed: Apr. 25, 2023

(65) Prior Publication Data

US 2023/0344567 A1      Oct. 26, 2023

Related U.S. Application Data

(60) Provisional application No. 63/334,725, filed on Apr. 26, 2022.

(51) Int. Cl.
*H04W 4/00* (2018.01)
*H04L 5/00* (2006.01)
*H04W 16/32* (2009.01)

(52) U.S. Cl.
CPC ............ *H04L 5/001* (2013.01); *H04L 5/0098* (2013.01); *H04W 16/32* (2013.01)

(58) Field of Classification Search
CPC ...... H04L 5/001; H04L 5/0007; H04W 16/32; H04W 76/15; H04W 88/085; H04W 92/12; H04W 28/04; H04W 72/04; H04W 72/042; H04W 88/08; H04W 28/08; H04W 28/084; H04W 36/22; H04W 72/12
See application file for complete search history.

(56) References Cited

U.S. PATENT DOCUMENTS

| | | | | |
|---|---|---|---|---|
| 6,285,874 | B1 * | 9/2001 | Magnusson | H04W 16/00 |
| | | | | 455/446 |
| 8,072,953 | B2 * | 12/2011 | Mukherjee | H04W 12/06 |
| | | | | 455/519 |
| 8,666,410 | B2 * | 3/2014 | Wu | H04W 36/0061 |
| | | | | 455/435.2 |

(Continued)

FOREIGN PATENT DOCUMENTS

| | | | | | |
|---|---|---|---|---|---|
| AU | 2009312285 | B2 * | 10/2014 | | H04W 8/02 |
| CN | 103945462 | | 2/2019 | | |
| WO | 2020208118 | A1 | 10/2020 | | |

*Primary Examiner* — Phuongchau Ba Nguyen
(74) *Attorney, Agent, or Firm* — Bryan Cave Leighton Paisner LLP

(57) ABSTRACT

A 5G gNodeB has a Centralized Unit (CU) and one or more Distributed Units (DU). Each of the one or more DUs has a cell topology information that it sends to the CU so that the CU has information for each DU for each of the DU's cells, including which cells are available to each primary cell for carrier aggregation. When a UE connects to the CU, the CU queries its configuration information—including cell topology information for the DU connected to the UE— to determine if and which secondary cells are available for carrier aggregation. If so, the CU may signal the DU to configure and subsequently activate the one or more secondary cells to which the UE can connect for carrier aggregation.

17 Claims, 4 Drawing Sheets

(56) References Cited

U.S. PATENT DOCUMENTS

| | | | | |
|---|---|---|---|---|
| 8,805,369 | B2 * | 8/2014 | Huang | H04W 72/20 |
| | | | | 455/437 |
| 10,743,251 | B2 * | 8/2020 | Horn | H04W 48/20 |
| 2014/0213263 | A1 * | 7/2014 | Ryan | H04W 36/0061 |
| | | | | 455/437 |
| 2015/0023283 | A1 | 1/2015 | Liu et al. | |
| 2020/0296693 | A1 | 9/2020 | Tang | |
| 2021/0243638 | A1 | 8/2021 | Bae et al. | |
| 2022/0110181 | A1 * | 4/2022 | Miao | H04L 5/0023 |
| 2022/0302994 | A1 * | 9/2022 | Sharma | H04B 7/15507 |
| 2023/0199558 | A1 * | 6/2023 | Wang | H04W 28/24 |
| | | | | 370/329 |
| 2024/0334278 | A1 * | 10/2024 | Jin | H04W 36/04 |

* cited by examiner

300

305 — DUs report cell topology

310 — CU populates cfg table

315 — CU recognizes UE on primary serving cell

320 — CU queries cfg table for available secondary cells

325 — CU compares available secondary cells to bands supported by UE

330 — CU allocates available supported secondary cells to UE

335 — CU sends F1 SCells To Be Added message to DU system set up

UE context set up

METHOD AND SYSTEM FOR EXCHANGING SECONDARY CELL INFORMATION FOR CARRIER AGGREGATION

This application claims the benefit of U.S. Provisional Application No. 63/334,725, filed on Apr. 26, 2022, the contents of which are all hereby incorporated by reference herein in their entirety.

BACKGROUND OF THE INVENTION

Field of the Invention

The present invention relates to wireless communications, and more particularly, to a method and a system for enabling a 5G gNodeB CU (Central Unit) and DU (Distributed Unit) to exchange secondary cell information.

Related Art

One of the key features of 5G NR (New Radio) involves the split of gNodeB functionality into a CU (Centralized Unit) and one or more DUs (Distributed Units). The CU performs the following upper layer protocols: SDAP (Service Data Adaptation Protocol) and RRC (Radio Resource Control), and PDCP (Packet Data Convergence Protocol). Each DU performs the following lower layer protocols: RLC (Radio Link Control), MAC (Medium Access Control), and PHY (Physical) layer. The CU communicates back and forth with the DUs over a 3GPP-defined F1 interface, exchanging signaling information and user data. The F1 interface includes an F1 AP (F1 Application Protocol), which provides signaling between the CU and the DUs over a SCTP (Stream Control Transmission Protocol) and supports Interface Management, UE (User Equipment) Context Management, and RRC Message Transfer procedures. Further to the F1 interface are a plurality of GTP-U (General Packet Radio Service Tunneling Protocol—User plane) tunnels that provide individual user data bearers over IP (Internet Protocol).

Examples of F1 AP Interface Management procedures include functions for configuring or updating the configuration of the CU and DUs. Examples of UE Context Management procedures include functions for setting up, modifying, and releasing UE contexts, which may be initiated by either the CU or the appropriate DU. Examples of RRC Message Transfer procedures include functions for establishing and messaging for UL (Uplink) and DL (Downlink) for each UE.

There is a deficiency in the F1 interface that arises with the implementation of Carrier Aggregation, in which a given UE may be allocated more than one serving cell (a primary cell and one or more secondary cells) whereby the different serving cells may each correspond to a different component carrier within a given frequency band or may correspond to component carriers in different frequency bands. It will be understood that Carrier Aggregation requires that all of the serving cells allocated to a given UE must be in the same sector or coverage area.

This deficiency takes two forms. In the first: there is no way for the CU to know, for each cell of the DU, which of the DU's other cells have the same sector coverage as that cell. In other words, for a given primary cell under the DU, the CU has no way of knowing which other cells under that DU are available as secondary cells to that primary cell. In the second, there is no way for the CU to command the DU to activate certain configured but deactivated secondary cells for use in carrier aggregation by a given UE.

SUMMARY OF THE DISCLOSURE

An aspect of the present disclosure involves a method for configuring a UE (User Equipment) for carrier aggregation in a 5G gNodeB. The method comprises a CU (Centralized Unit) receiving a cell topology information from a DU (Distributed Unit), the cell topology information corresponding to a plurality of cells coupled to the DU, the cell topology information including, for each of the plurality of cells, one or more candidate secondary cells corresponding to each of the plurality of cells; and the CU storing the cell topology information.

Another aspect of the present disclosure involves a method for configuring a UE (User Equipment) for carrier aggregation in a 5G gNodeB. The method comprises a CU (Centralized Unit) receiving an A1 event report from the UE, the A1 event report corresponding to a deactivated secondary serving cell, wherein the UE is connected to the CU via a DU (Distributed Unit); and the CU signaling the DU to activate the deactivated secondary serving cell.

Another aspect of the present disclosure involves a method for deactivating a secondary cell used by a UE (User Equipment) in carrier aggregation. The method comprises a CU (Centralized Unit) receiving an A2 event report regarding the secondary serving cell; and the CU signaling the DU to deactivate the secondary serving cell.

DESCRIPTION OF EXEMPLARY EMBODIMENTS

Figure 1:
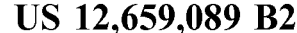
FIG. 1 illustrates an exemplary 5G gNodeB deployment that implements processes according to the disclosure.

FIG. 1 illustrates an exemplary gNodeB deployment 100 that takes advantage of the flexibility designed into the 5G NR architecture. gNodeB 100 has a CU 105, which may have a configuration table 110. Configuration table 110 may be encoded in machine-readable memory that may be integral to CU 105 or may be remotely located. Coupled to CU 105 are DUs 115a, 115b, and 115c. Each DU 115a/b/c has a plurality of cells 125, some of which are arranged in co-located sectors. DU 115a has a cell topology table 120a, which contains information about its cells 125. Information in cell topology table 120a may include information pertaining to each cell 125, such as frequency band, carrier frequency within the frequency band, and sector information. The information may also include, for each cell 125, which other cells under DU 115*a* are available to the cell as a secondary cell for carrier aggregation. In this example, DU 115*a* has six cells 125 arranged in three sectors, whereby each sector has two cells operating at distinct carrier frequencies. Each of the overlapping cells 125 may be available as a secondary cell to the other cell 125. DU 125*b*, as illustrated, has three cells 125, each occupying a distinct sector, and thus have no overlapping sectors. DU 115*c* has nine cells 125 arranged in three sectors, whereby each sector has three cells 125 that operate in a distinct carrier. Each DU 115*a/b/c* has a cell topology table 120*a/b/c*, which contains information that may be encoded in a machine-readable memory that may be read from or written to by one or more processors (not shown) of its corresponding DU 115*a/b/c*.

Each DU 115*a/b/c* is coupled to CU 105 by an F1 interface 130. In accordance with the standard, each F1 interface 130 may have an F1AP channel and a plurality of user-specific GTP-U tunnels, all of which may be implemented over IP (Internet Protocol).

Each DU 115*a/b/c* may be coupled to one or more antennas (not shown) that enable transmission and reception of radio signals at the given carrier frequencies and over the corresponding sectors. Each DU 115*a/b/c* may also be coupled to one or more intervening radio remote units (not shown) between the DU 115*a/b/c* and the antennas. It will be understood that such variations are possible and within the scope of the disclosure.

Figure 2:
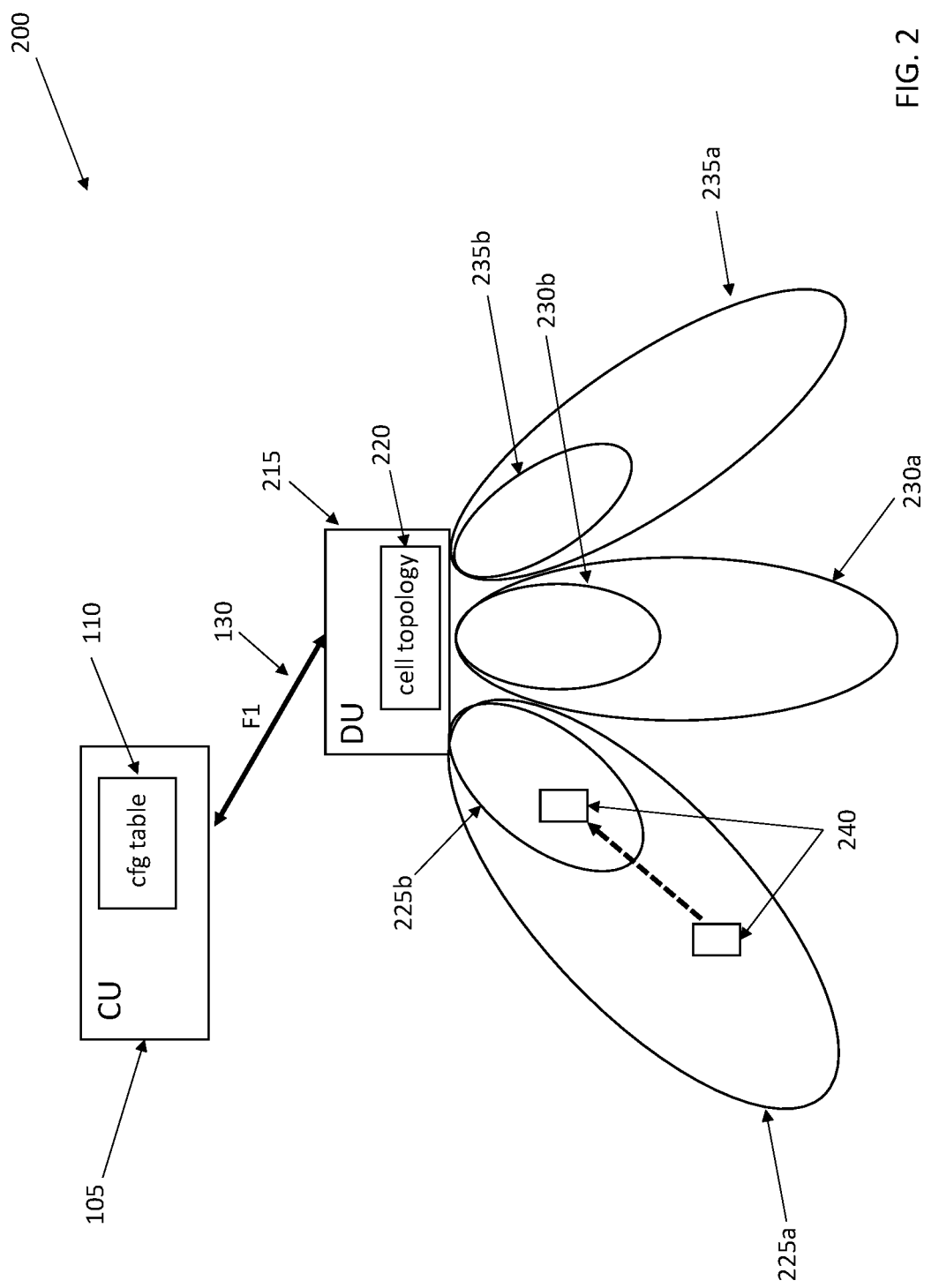
FIG. 2 illustrates an another exemplary gNodeB deployment that implements processes according to the disclosure.

FIG. 2 illustrates an alternate exemplary implementation of a gNodeB 200 that includes CU 105 and a DU 215. Exemplary CU 105 and F1 interface may be identical to that disclosed above with respect to FIG. 1. As illustrated in FIG. 2, DU 215 has a cell topology table 220, which may be similar in implementation to cell topology tables 120*a-c* of FIG. 1.

Exemplary DU 215 has six cells covering three sectors. A first sector is covered by cells 225*a* and 225*b*, each of which may operate in a different frequency band, which may cause cells 225*a* and 225*b* to have different ranges of coverage within the first sector. DU 215 may have a second sector covered by two cells 230*a* and 230*b*, each of which may correspond to a different frequency band, resulting in different coverage ranges in a manner similar to the first sector. Finally, DU 215 may have a third sector covered by cells 235*a* and 235*b*, each of which may correspond to a different frequency band, resulting in different coverage ranges in a manner similar to the first sector and second sector.

Although not shown in FIG. 2, exemplary gNodeB 200 may have additional DUs, each of which may have cells in varying topologies. It will be understood that such variations are possible and within the scope of the disclosure.

Also illustrated in FIG. 2 is a UE 240, which is depicted as moving from a first location in which it is within the cell coverage area of a single serving cell 225*a* to a second location in which it is within the cell coverage area of two serving cells 225*a* and 225*b*.

In a variation of both gNodeBs 100/200, DUs 115*a/b/c* and/or DU 215 may be implemented as O-DUs (O-RAN Distributed Units), each of which may be further coupled to multiple O-RUs (O-RAN Radio Units). Various topologies of O-RUs for each O-DU (DU 115*a/b/c* or 215) are possible, as described in Chapter 11 of O-RAN specification WG4.CUS.0-v07.00. One example topology has a single O-DU that is coupled to multiple O-RUs over an eCPRI (evolved Common Public Radio Interface) connection that uses Ethernet. This 7.2 connection between the O-DU and the O-RUs may be through an FHM (Fronthaul Multiplexer) that can copy/combine 7-2x data so that the O-RUs may operate in a single cell, separate and independent cells, or a combination of both. Further to this, an additional FHM may be added in place of an O-RU that enables the cascading of another plurality of O-RUs that may be of a single cell or multiple cells. In this case, each DU 115*a/b/c* (FIG. 1) or 215 (FIG. 2) may have multiple subsequent O-RUs that may be geographically distributed. This may have the effect of greatly increasing the number of cells corresponding to a given DU, some of which may be physically co-located and many of which may be distributed over a wide area. And given the possibility of multiple DUs, the number of cells under this scheme may exceed the numbers envisioned in conventional RAN (Radio Access Network) architectures. It will be understood that such variations are possible and within the scope of the disclosure.

The following process descriptions are described in the context of gNodeB 200, although it will be understood that the processes below may apply to alternate embodiments of gNodeB 100 and 200, and that such variations are within the scope of the disclosure.

Figure 3:
FIG. 3 illustrates an exemplary process by which a gNodeB Centralized Unit may receive information from a Distributed Unit regarding available cells and which cells correspond to which sectors, and by which Centralized Unit may accordingly allocate carriers for carrier aggregation.
Figure 3:
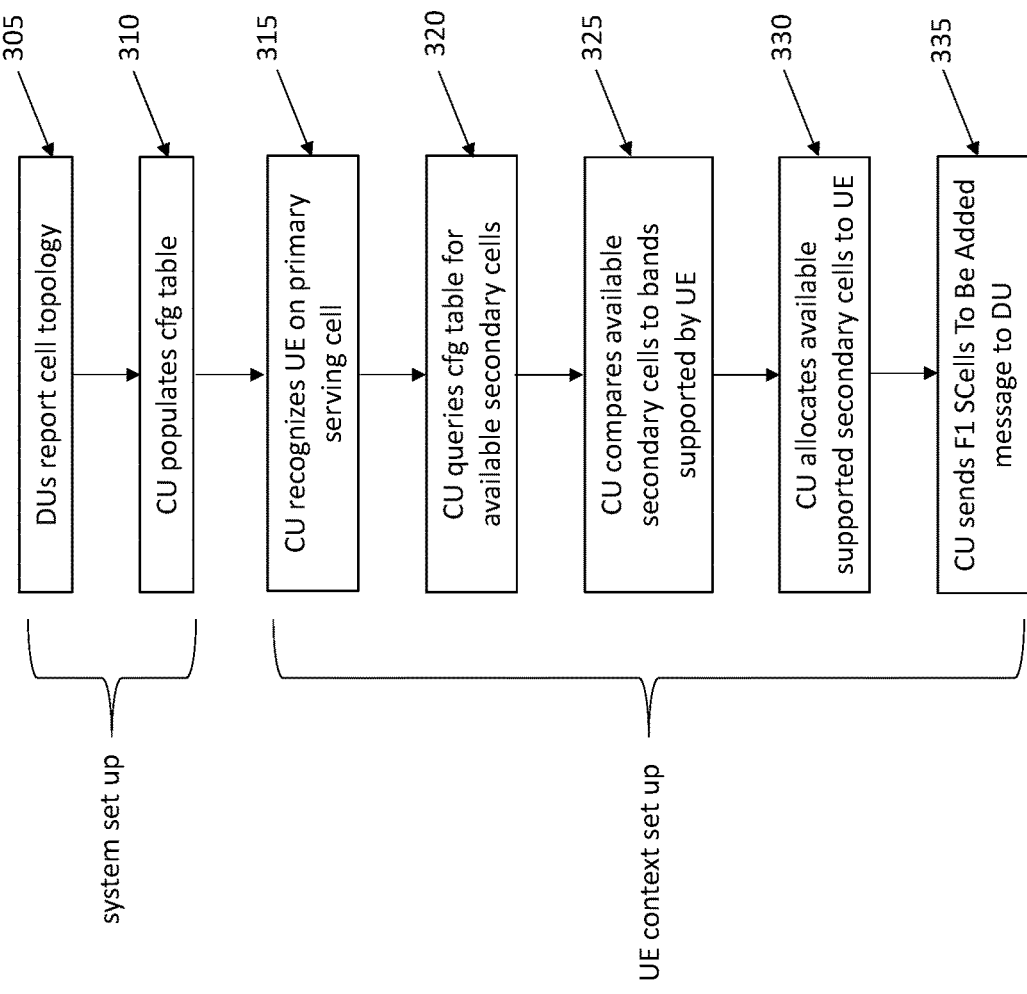

FIG. 3 illustrates an exemplary process 300 by which CU 105 may receive information from DU 215 regarding its cell topology: a cell identifier for each cell 225*a/b*, 230*a/b*, 235*a/b*; its frequency band and carrier frequency; its bandwidth; its sector; and a list of other cells (e.g., by cell identifier) that are available as secondary serving cells to a UE connected to that cell, and by which CU 105 may allocate cells for carrier aggregation. The steps of process 300 may be performed by processors (not shown) within or corresponding to CU 105 and DU 215. In doing so, the processors may execute machine readable instructions that are encoded within one or more non-transitory memory devices and executed by one or more processors that perform their respective described functions. As used herein, "non-transitory memory" may refer to any tangible storage medium (as opposed to an electromagnetic or optical signal) and refers to the medium itself, and not to a limitation on data storage (e.g., RAM vs. ROM). For example, non-transitory medium may refer to an embedded volatile memory encoded with instructions whereby the memory may have to be re-loaded with the appropriate machine-readable instructions after being power cycled. Further, if an action is described herein as being done by a referenced component (e.g., "CU 105 signals to DU 215") it will be understood that this implies that one or more processors corresponding to the referenced component executes machine-readable instructions to perform the action.

In step 305, DU 215 reports its cell topology stored in its cell topology table 220 to CU 105 over F1 interface 130. This report may include information about each of its cells 225*a/b*, 230*a/b*, 235*a/b*: its cell identifier; its frequency band and carrier frequency; its bandwidth; its sector; and a list of other cells (e.g., by cell identifier) that are available to a UE connected to that cell. The available additional cells may be for the purpose of carrier aggregation for a given UE in that cell. This cell information may include cells that are active under DU 215 as well as cells that are inactive—e.g., in a locked state—under DU 215. In the illustrated example, DU 215 may report that cells 225*a* and 225*b* cover the same sector and that each may be available to the other as a secondary serving cell for carrier aggregation. DU 215 may report the same for cells 230*a/b* and cells 235*a/b*, respectively.

DU 215 may report cell topology information over F1 interface 130 to CU 105 using, for example, the pre-existing gNB-DU Served Cells Item defined in 3GPP TS 38.473. In this example, the processors in DU 215 may append the gNB-DU Served Cells Item with the above-described cell topology information, with the cell topology information being assigned a 16-bit identifier by DU 215 so that the information may be extracted by CU 105. This may be done during an F1 Setup procedure or during a gNB-DU Configuration Update procedure.

In the case of an O-RAN implementation, DU 215 (here an O-DU) reports all of its O-RUs that are coupled to it through one or more FHMs. Although the number of O-RUs may be greater than in a non-O-RAN implementation, the topology information may be the same and process 300 may work the same way. One difference is that in an O-RAN implementation, copying and combining of 7-2× data between the O-DU and the O-RUs is handled by the one or more FHMs. However, this is transparent to the implementation of process 300.

In step 310, the processor of CU 105 executes instructions to update its configuration table 110 with the information that DU 215 provided to it in step 305.

Steps 305 and 310 may be performed by DU 215 and CU 105 in an initial set up process for gNodeB 200, or they may be performed if/when DU 215 reports a new or revised topology to CU 105. However, subsequent steps 315-335 may be performed by CU 105 on setup of a UE context when a UE connects to a cell (e.g., UE 240 connects to cell 225a), or changes the state of its connection to an existing cell.

In step 315, CU 105 recognizes a given UE as being connected to a primary serving cell. In the example in FIG. 2, CU 105 establishes a connection with UE 240 over cell 225a, using existing 3GPP-defined procedures.

In step 320, CU 105 queries its configuration table 110 for information about other cells that are available as secondary serving cells to UE 240. In the example, CU 105 may retrieve information that cell 225b may be available as a secondary serving cell to UE 240.

In step 325, CU 105 compares the list of available secondary serving cells to the bands (e.g., band n41) and/or band combinations supported by the UE. In the example, CU 105 checks to see if the frequency of cell 225b is supported by UE 240. This UE capability information may be reported to CU 105 in an RRC message directly from UE 240. Alternatively, CU 105 may obtain this information from the core network (not shown) if, for example, UE 240 joined cell 225a via a handover from a cell (not shown) of the same network operator. In other examples, UE 240 may be in a cell-dense environment in which there are numerous available secondary cells. However, it may be that only some of those available secondary cells are in bands or band combinations that are supported by UE 240. In this case, CU 105 will disregard unsupported cells.

In step 330, CU 105 allocates available secondary cells to UE 240 for carrier aggregation, which may be implemented once UE 240 is within coverage of cell 225b. As is consistent with the 3GPP specification, CU 105 has discretion in allocating secondary cells to UE 240 for carrier aggregation. For example, it may be that the data demands of UE 240 are sufficiently low that there is no need for carrier aggregation, or it may be the case that other UEs (not shown) in the coverage of cell 225a have greater needs for high bandwidth data rates and thus CU 105 may give preferential access to other cells to those UEs at the expense of UE 240. It will be understood that such variations are possible and within the scope of the disclosure. The remaining discussion covers the situation in which CU 105 allocates cell 225b to UE 240. CU 105 may exercise discretion in how it allocates secondary cells for UE 240. For example, an available single secondary cell may have sufficient bandwidth (e.g., 100 MHz) to provide effective carrier aggregation, or more than one secondary cell may be required if each of the available secondary cells have lower bandwidth (e.g., 20 MHz). Further, CU 105 may allocate secondary cells based on a desired aggregate throughput and decide which combination of secondary cells (in conjunction with the primary service cell) will best meet that aggregate throughput. CU 105 may also factor supported MIMO layers in allocating secondary cells.

In step 335, CU 105 sends an F1-based message to DU 215, instructing DU 215 to relay information to UE 240 to add cell 225b as a configured serving cell in a deactivates state. This may be done by sending a 'SCell To Be Added' message within conventional F1 information elements to add cell 225b to its list of configured but deactivated secondary cells. The result of step 335 is that UE 240 has cell 225b added to its list of configured but deactivated candidate secondary cells.

An advantage of process 300 of the disclosure is that CU 105 has UE 240 add only those cells of DU 215 that are within cellular coverage of UE 240, and only those cells that UE 240 supports. This becomes increasingly important in the case of DUs that have many cells. This is especially true in an exemplary embodiment in which DU 215 is implemented as an O-RAN O-DU, in which case there may be numerous O-RUs scattered across a large geographical area (e.g., a university campus) with each O-RU coupled to the O-DU using a 7-2× split interface. In this case, DU 215 may have as many as a hundred individual cells, only a few of which are within coverage of UE 240. The disclosed system and processes enable CU 105 to instruct UE 240 (through the DU 215) to add only candidate secondary cells that are within coverage and supported by the UE 240.

Cell topology information may change during operation. For example, DU 215 may be configured to use CBRS (Citizens Broadband Radio Service) channels, in which case DU 215 may operate as a CBSD (Citizens Broadband radio Service Device). In this example, DU 215 is granted access to use designated CBRS channels by a SAS (Spectrum Allocation Service) (not shown). The SAS may subsequently revoke the grant to DU 215 to use a given CBRS channel. In this case, for example, if cell 230b corresponds to a CBRS channel to which its grant has been revoked, then DU 215 may update its cell topology table 220 and report to CU 105 (step 305) that its cell 230b is no longer available for use either as a primary cell or a secondary cell for carrier aggregation. Further to this example, the SAS may grant access to DU 215 to use an alternate CBRS channel. In this case, the processor of DU 215 may execute instructions to reconfigure itself to use the newly granted channel in the same sector (say, cell 230b'), update its cell topology table 220 accordingly, and report this change to CU 105 (step 305). This may be done during a gNB-DU Configuration Update procedure.

Figure 4:
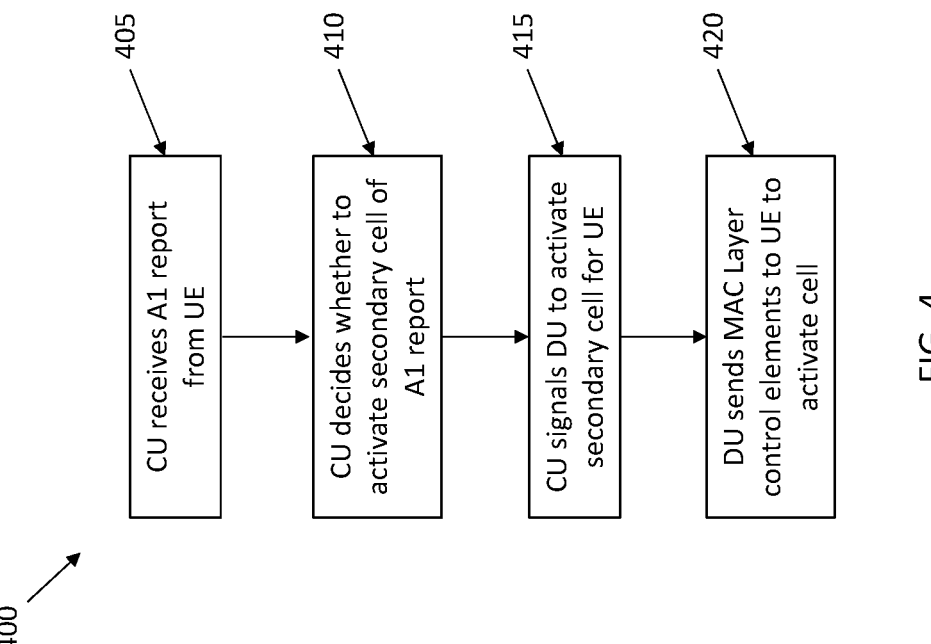
FIG. 4 illustrates an exemplary process by which a Centralized Unit may use information received from a UE to add a configured secondary serving cell for carrier aggregation with the UE.

FIG. 4 illustrates an exemplary process 400 by which CU 105 may use information received from a given UE to activate one or more secondary serving cells for carrier aggregation. As with exemplary process 300, exemplary process 400 is described herein in the context of the subset of gNodeB 200 illustrated in FIG. 2. However, it will be understood that process 400 may apply to the gNodeB 100 of FIG. 1, and variations thereof.

In step 405, CU 105 receives an A1 event report from UE 240. The A1 event is described in 3GPP TS 38.331. In an A1 event, UE 240 reports to CU 105 that a measurement of signal strength from a configured serving cell has gone above a specified threshold. This may apply to a configured serving cell that is active as well as to a configured serving cell that is inactive. If UE 240 is using carrier aggregation, the A1 event report includes the same information for the primary cell as well as the one or more secondary cells being used.

In the example illustrated in FIG. 2, UE 240 may have moved from its initial position within sole coverage of cell 225a to its final location within coverage of cells 225a and 225b. As UE 240 enters coverage of cell 225b, UE 240 measures an increase in cell 225b signal strength that goes above a predetermined threshold. Once this occurs, UE 240 sends an A1 event report to CU 105 pertaining to cell 225b.

In step 410, CU 105 decides whether to activate the reported secondary serving cell (cell 225b) for carrier aggregation with UE 240. CU 105 has discretion in doing so. For example, if the data usage by UE 240 is such that its demand for data is low, CU 105 may take no action. Alternatively, CU 105 may be handling a great deal of data demand from other UEs that have priority in data usage. Otherwise, CU 105 may decide to activate the reported cell to implement carrier aggregation. In the illustrated example, CU 105 decides to activate cell 225b to implement carrier aggregation with UE 240.

In step 415, the processor of CU 105 signals DU 115 to activate the secondary cell (cell 225b) identified in the A1 event report for carrier aggregation. In doing so, CU 105 may provide this signal through a vendor-specific Information Element (IE) appended to an existing UE CONTEXT MODIFICATION REQUEST message. This could take the form of a list of NR CGI, SCell Activation/Deactivation Status pairs. This enables CU 105 to relay information to DU 215 to toggle the desired activation/deactivation state of each serving cell covering UE 240 (in this case, to activate inactive configured serving cell 225b).

In step 420, having received the information from CU 105 of step 415, DU 215 may send the necessary MAC Layer control elements to UE 240, instructing it to activate inactive configured serving cell 225b so that CU 105 may implement carrier aggregation.

Figure 5:
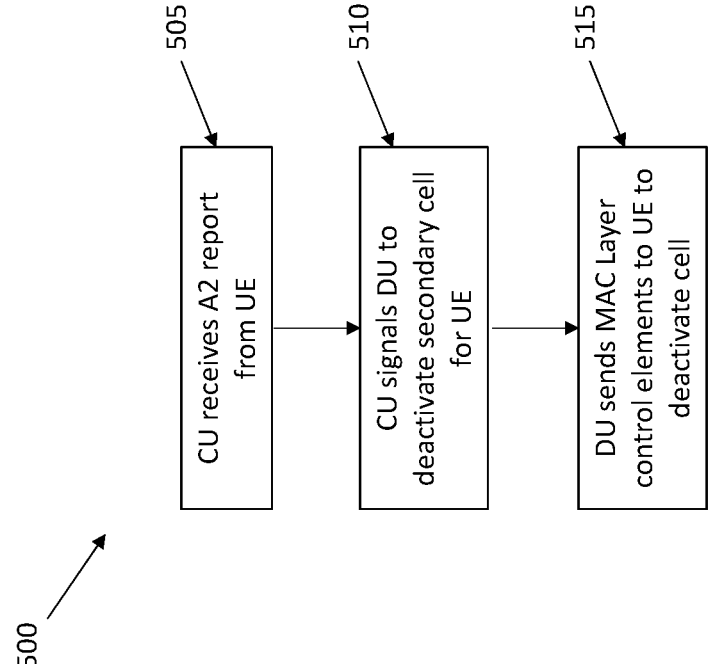
FIG. 5 illustrates an exemplary process by which a Centralized Unit may use information received from the UE for deactivating a secondary serving cell that is no longer viable for carrier aggregation.

FIG. 5 illustrates an exemplary process 500 by which CU 105 may use information received from UE 240 to deactivate secondary serving cell 225b. As with exemplary process 400, exemplary process 500 is described herein in the context of the subset of gNodeB 200 illustrated in FIG. 2. However, it will be understood that process 500 may apply to the gNodeB 100 of FIG. 1, and variations thereof. In the example illustrated in FIG. 2, UE 240 begins at the location where it is within coverage of both cells 225a/b, and moves in the direction opposite the illustrated dotted arrow, out of coverage of cell 225b.

As UE 240 moves out of coverage of cell 225b, it measures the signal strength from cell 225b as it drops to below a predetermined threshold, triggering an A2 event. In step 505, CU 105 receives the A2 event report from UE 240 regarding cell 225b.

In step 510, CU 105 ceases to use cell 225b in carrier aggregation with UE 240 and signals DU 215 to have UE 240 deactivate cell 225b. In doing so, CU 105 may provide this signal through the vendor-specific Information Element (IE) appended to an existing UE CONTEXT MODIFICATION REQUEST message described above with regard to step 415.

This could take the form of a list of NR CGI, SCell Activation/Deactivation Status pairs. This enables CU 105 to relay information to DU 215 to deactivate cell 225b for UE 240.

In step 515, DU 215 sends the appropriate MAC Layer control elements to signal UE 240 to deactivate cell 225b per instructions from CU given in step 510.

What is claimed is:

1. A method for configuring a UE (User Equipment) for carrier aggregation in a 5G gNodeB, comprising:
   receiving cell topology information from a DU (Distributed Unit), the cell topology information corresponding to a plurality of cells coupled to the DU, the cell topology information including, for each of the plurality of cells, information relating to each of one or more candidate secondary cells corresponding to each of the plurality of cells;
   storing the cell topology information; and
   allocating at least one candidate secondary serving cell to the UE based on the stored cell topology information related to the at least one candidate secondary serving cell, aggregate throughput, and capabilities of the UE.

2. The method of claim 1, further comprising:
   connecting the UE to a primary serving cell among the plurality of cells; wherein the allocating of the at least one candidate secondary serving cell comprises:
   querying the stored cell topology information related to each of the one or more candidate secondary cells corresponding to the primary serving cell;
   comparing the cell topology information related to each of the one or more candidate secondary cells corresponding to the primary serving cell with a set of supported bands corresponding to the UE;
   based on a result of the comparing, identifying the at least one candidate secondary serving cell; and
   signaling the DU to add the at least one identified candidate secondary serving cell to a list of allocated serving cells corresponding to the UE, the list at least comprising the at least one identified candidate secondary serving cell.

3. The method of claim 2, wherein the comparing of the cell topology information related to each of the one or more candidate secondary serving cells corresponding to the primary serving cell with the set of supported bands corresponding to the UE comprises:
   comparing the cell topology information related to each of the one or more candidate secondary cells with a supported band combination.

4. The method of claim 2, wherein identifying the at least one candidate secondary serving cell comprises:
   discarding one or more unsupported secondary cells from the one or more candidate secondary serving cells.

5. The method of claim 2, wherein identifying the at least one candidate secondary serving cell comprises:
   discarding one or more candidate secondary serving cells based on a data demand.

6. The method of claim 5, wherein the data demand comprises a data demand of the UE.

7. The method of claim 5, wherein the data demand comprises a data demand of a plurality of other UEs connected to the primary serving cell.

8. The method of claim 2, wherein the gNodeB receives the cell topology information from the DU and signals the DU over a 3GPP F1 interface.

9. The method of claim 2, wherein the cell topology information comprises, for each of the plurality of cells and each of the one or more candidate secondary cells corresponding to each of the plurality of cells:

a cell identifier;

a carrier frequency associated with the cell;

a frequency band associated with the cell; and a sector associated with the cell.

10. The method of claim 9, wherein comparing the cell topology information related to each of the one or more candidate secondary serving cells with a set of supported bands corresponding to the UE comprises:

comparing the band of each of the candidate secondary serving cells with the set of supported bands corresponding to the UE.

11. The method of claim 2, wherein signaling the DU to add the at least one identified candidate secondary serving cell comprises:

sending an 'SCell To Be Added' message to the DU.

12. The method of claim 1, wherein receiving cell topology information from the DU comprises receiving a gNB-DU Served Cells Item.

13. The method of claim 1 further comprising:

signaling the UE, by the DU, to add the at least one identified candidate secondary serving cell to a list of allocated secondary cells in a deactivated state, the list at least comprising the at least one identified candidate secondary serving cell.

14. A 5G gNodeB, capable of configuring a UE (User Equipment) for carrier aggregation, comprising:

one or more processors; and one or more non-transitory memory devices having stored therein machine readable instructions that, when executed by the one or more processors, cause the 5G gNodeB to:

receive cell topology information from a DU (Distributed Unit), the cell topology information corresponding to a plurality of cells coupled to the DU, the cell topology information including, for each of the plurality of cells, information relating to each of one or more candidate secondary cells corresponding to each of the plurality of cells;

store the cell topology information; and allocate at least one candidate secondary serving cell to the UE based on the stored cell topology information related to the at least one candidate secondary serving cell, aggregate throughput, and capabilities of the UE.

15. The 5G gNodeB of claim 14, wherein the execution of the machine readable instructions further causes the 5G gNodeB to:

connect the UE to a primary serving cell among the plurality of cells;

query the stored cell topology information related to each of the one or more candidate secondary cells corresponding to the primary serving cell;

compare the cell topology information related to each of the one or more candidate secondary cells corresponding to the primary serving cell with a set of supported bands corresponding to the UE;

identify, based on a result of the comparison, the at least one candidate secondary serving cell; and signal the DU to add the at least one identified candidate secondary serving cell to a list of allocated serving cells corresponding to the UE, the list at least comprising the at least one identified candidate secondary serving cell.

16. The 5G gNodeB of claim 15, wherein the cell topology information comprises, for each of the plurality of cells and each of the one or more candidate secondary cells corresponding to each of the plurality of cells:

a cell identifier;

a carrier frequency associated with the cell;

a frequency band associated with the cell; and a sector associated with the cell.

17. The method of claim 16, where the comparison of the cell topology information related to each of the one or more candidate secondary serving cells with a set of supported bands corresponding to the UE comprises:

comparing the band of each of the candidate secondary serving cells with the set of supported bands corresponding to the UE.

* * * * *